United States Patent [19]

Ross

[11] 3,713,111

[45] Jan. 23, 1973

[54] OPERATION OF MEMORY ARRAY EMPLOYING VARIABLE THRESHOLD TRANSISTORS

[75] Inventor: Edward Charles Ross, Hightstown, N.J.

[73] Assignee: RCA Corporation

[22] Filed: Dec. 14, 1970

[21] Appl. No.: 97,798

[52] U.S. Cl. ................................340/173 R, 307/238

[51] Int. Cl. ..........................G11c 11/34, G11c 11/40

[58] Field of Search .........340/173 R, 173.2, 174 TF; 307/238

[56] References Cited

UNITED STATES PATENTS

| | | | |
|---|---|---|---|
| 3,508,211 | 4/1970 | Wegener | 340/173 |
| 3,549,911 | 12/1970 | Scott | 340/173 |
| 3,387,289 | 6/1968 | Walter | 340/174 TF |
| 3,478,336 | 11/1969 | Kashiwagi et al. | 340/174 TF |
| 3,452,338 | 6/1969 | Siegle | 340/174 TF |
| 3,573,757 | 4/1971 | Adams | 340/173 |
| 3,445,823 | 5/1969 | Petersen | 340/173 |
| 3,530,441 | 9/1970 | Ovshinsky | 340/173 |
| 2,784,389 | 3/1957 | Kelly | 340/173 |
| 3,480,843 | 11/1969 | Richardson | 340/173 |

*Primary Examiner*—Malcolm A. Morrison
*Assistant Examiner*—James F. Gottman
*Attorney*—H. Christoffersen

[57] ABSTRACT

Means for cycling a variable threshold field-effect semiconductor memory device to one selected threshold level and then to another selected threshold level before each write operation to minimize a shift in the selected threshold levels.

8 Claims, 4 Drawing Figures

INVENTOR
*Edward C. Ross*
BY
ATTORNEY

INVENTOR
Edward C. Ross
BY
Henry Schanzer
ATTORNEY

OPERATION OF MEMORY ARRAY EMPLOYING VARIABLE THRESHOLD TRANSISTORS

BACKGROUND OF THE INVENTION

A memory array using one active element per bit location has been sought for a number of years. A field-effect transistor having a metal-insulator-silicon (MIS) structure in which charge can be stored, promises to fill this need since it is a transistor which may assume two stable threshold voltage levels and which may be fabricated by large-scale integrated circuit techniques to provide large memory arrays which are small, have a high information density and which are potentially inexpensive. The two stable threshold levels correspond to two stable states which in binary systems may be defined as logic 1 and logic 0.

Actually, the threshold levels of the MIS transistors are multi-valued but in practice (e.g., in binary systems) the threshold levels are set to either one of two threshold levels (stable states) selected from a multiplicity of possible threshold values. The transistors are set to selected ones of their stable states by applying given potentials of greater than a given reference value between the gate and the substrate (across the insulating layers) in a direction to either inhibit or enhance conduction.

The threshold level to which the transistor is set is not merely a function of the potential applied across its insulating layer, but is also a function of the length of time a pulse of given amplitude is applied. It has been discovered by the present inventor that this time dependent characteristic of the device gives rise to serious problems in its operation. For example, the application of a long pulse, or the repeated application of pulses having the same polarity causes the threshold level to shift. The shift in the threshold level changes the operating points of the device. Furthermore, when a large number of pulses of the same polarity are applied to a device which was initially of the enhancement type (which does not conduct with zero volts applied between the gate and the substrate), it may become a depletion type device (which conducts with zero volts applied between the gate and source). The result is that the point of response (i.e., threshold level) of the devices is changed and that if the device becomes of the depletion type in a system designed to handle only enhancement type transistors, operational errors will occur. That is, erroneous signals will be present when the memory is interrogated.

SUMMARY OF THE INVENTION

The present invention resides in part in the recognition that the threshold level of variable threshold devices which is analog in nature is subject to shifts as a function of the repeated application of applied electric fields of the same polarity to the insulator structure. It also resides in the circuit means and methods for obtaining a relatively stable threshold level. These include means for setting the threshold level of a field-effect semiconductor device having a variable threshold characteristic to one of two threshold levels including means for applying pulses of a given width and amplitude, said amplitude being greater than a given reference value, between the gage and substrate of said device and means for cycling the device to one and then to the other of the two threshold levels before each new setting operation.

DETAILED DESCRIPTION OF THE INVENTION

The semiconductor devices comtemplated for use in practicing the invention have a variable threshold voltage level ($V_T$) which may be set to one of two of a multiplicity of values by applying a potential of greater than given amplitude between the gate and substrate of the device and which maintain the threshold voltage ($V_T$) to which they are set for a considerable period of time. Included in this class of devices are field-effect transistors having a metal-insulator-semiconductor (MIS) structure in which charge can be stored.

A specific, but not limiting, example of the above type of transistor is one whose insulating layer is a double layer of silicon nitride and silicon dioxide and which is commonly referred to as an MNOS (metal-nitride-oxide-silicon) device. This transistor may be fabricated using standard metal-oxide semiconductor (MOS) techniques, except that just prior to metallization, the gate oxide is made very thin and a nitride layer is deposited between the silicon dioxide and the gate of the device. The resulting transistor may be of either the P-type or the N-type and has first and second electrodes defining the ends of a conduction path and a gate electrode which is used to control the level of conduction in the conduction path. The transistor has the same general characteristics as a standard MOS device except that the addition of the insulating nitride layer over the thin oxide region allows charge to be stored at or near the interface between the two insulators and results in the characteristics shown in FIG. 1.

Figure 1:
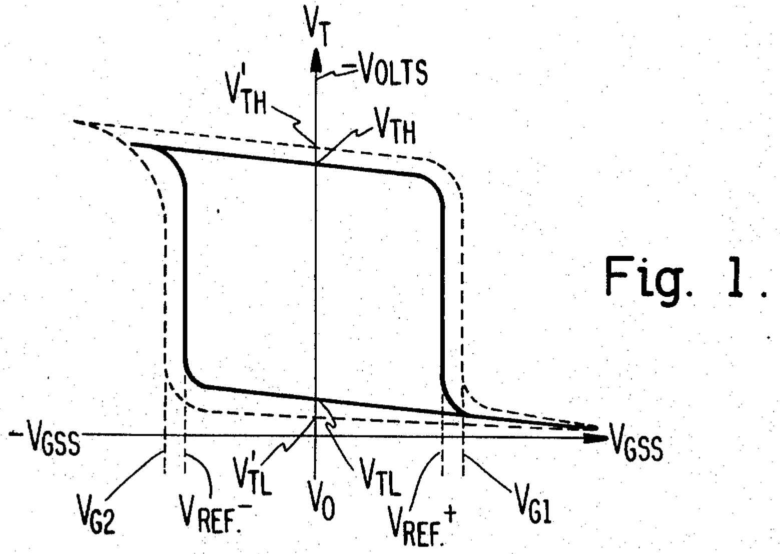
FIG. 1 is a plot of threshold voltage ($V_T$) as a function of the applied gate-to-substrate potential illustrating the bistable characteristics of the devices used to practice the invention.

FIG. 1 is an idealized representation of the hysteresis characteristic of the $V_T$ as a function of applied gate-to-substrate voltage ($V_{GSS}$) of a P-type conductivity MNOS device for a given pulse width. $V_T$ is defined as the gate-to-source potential at which current may start to flow in the conduction path of the transistor. The point marked $V_{TL}$ refers to the low value of $V_T$ and the point marked $V_{TH}$ refers to the high value of $V_T$. $V_{TL}$ may, for example, be minus two volts and $V_{TH}$ may be minus six volts. The reference voltages $V^+_{REF}$ and $V^-_{REF}$ indicate the gate-to-source potentials at which the transistor changes state. The value of $V^+_{REF}$ and $V^-_{REF}$ depends upon the particular device employed and the pulse width used, however, for purposes of the present discussion, they are assumed to be between −15 volts and +15 volts.

Any value of $V_{GSS}$ (for a given pulse duration) smaller than $V^+_{REF}$ or $V^-_{REF}$ does not affect the threshold setting of the semiconductor device depicted in FIG. 1. However, if $V_T$ initially is $V_{TL}$ and $V_{GSS}$ is made greater and more negative than $V^-_{REF}$, the threshold voltage follows the hysteresis curve upward as shown in FIG. 1, and takes on the value of $V_{TH}$. When, and if, $V_{GSS}$ is subsequently reduced to zero volts, $V_T$ remains set at $V_{TH}$. If the threshold voltage initially is $V_{TH}$ and $V_{GSS}$ is made greater the more positive than $V^+_{REF}$, the threshold voltage follows the hysteresis curve downward and $V_T$ takes on the value of $V_{TL}$. When, and if, $V_{GSS}$ is subsequently reduced to zero volts, $V_T$ remains set at $V_{TL}$.

Figure 4:
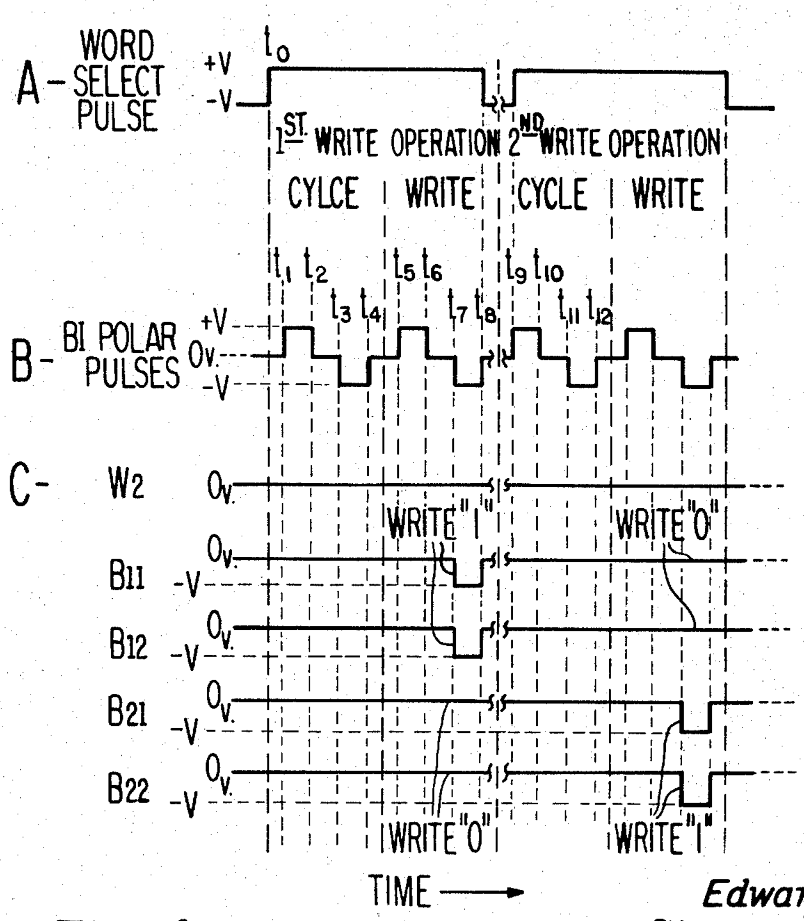
FIG. 4 is a drawing of some of the waveforms associated with the circuit of FIG. 3.

The MNOS transistors under discussion are analog devices which are capable of being set to a number of threshold states. For example, by applying a $V_{GSS}$ greater than $V^+_{REF}$ (e.g., $V_{G1}$) the P-type transistor may be set to a $V'_{TL}$ state as shown in FIG. 1. Alternatively, by applying a $V_{GSS}$ which is more negative than $V^-_{REF}$ (e.g., $V_{G2}$), the P-type transistor may be set to a $V'_{TH}$ state as shown in FIG. 4. In practice, for most logic applications, the voltages applied between the gate, the substrate, and the electrodes of the devices are limited to specific levels (±V) such that the devices are caused to assume only one of two of the many available threshold conditions for single pulse operation.

Note that for the N-type transistors a $V_{GSS}$ more negative than $V^-_{REF}$ (in a direction to inhibit conduction) sets the device to a low threshold voltage state and a $V_{GSS}$ more positive than $V^+_{REF}$ (in a direction to enhance conduction) sets the device to a high threshold voltage state.

Of significance to the proper use of these devices is the discovery that they are sensitive to the length of time ($t$) a given potential (V), greater in amplitude than $V_{REF}$, is applied across their insulating layer. Measurements taken on a sample device showed the following: *a*) applying a pulse of 28 volts amplitude and of 10 microseconds width, in a direction to inhibit conduction set the low threshold level ($V_{TL}$) to −1.5 volts and applying a 28 volt amplitude pulse of 10 microseconds width in a direction to enhance conduction set the high threshold level ($V_{TH}$) to −5.8 volts; *b*) applying a 100 microsecond wide pulse of 28 volt amplitude, in a direction to inhibit conduction set $V_{TL}$ to +0.5 volts and applying the 100 microseconds wide 28 volt amplitude pulse in a direction to enhance conduction set $V_{TH}$ to −8 volts. Thus, the threshold levels of the device shifted as a function of the length of time an electric field (due to the pulse) was applied across the insulator. Also, the shift was of such a nature as to change the operation, for one threshold level, from one of the enhancement type to one of the depletion type.

Figures 2, 3:
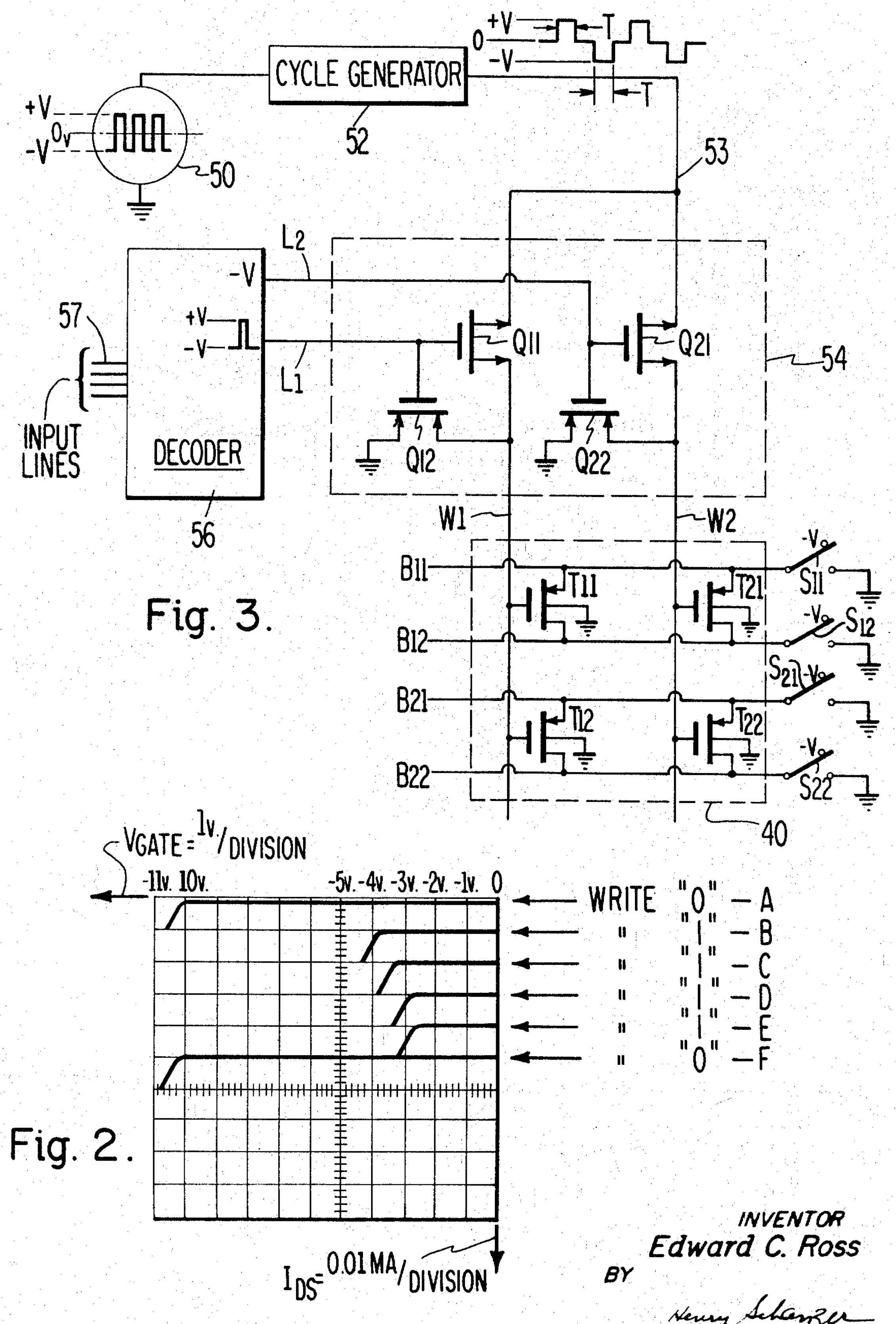
FIG. 2 is a reproduction of an oscilloscope display illustrating the "shift" in the threshold voltage of the devices used to practice the invention.
FIG. 3 is a drawing of a system, embodying the invention, for driving a matrix array.

FIG. 2 shows, pictorially, measurements taken of another sample device where a series of write "1" pulses were applied to the device following the application of a write "0" pulse. FIG. 2 illustrates the effect of repeatedly pulsing a device undirectionally and demonstrates that applying a pulse of amplitude V for a time T is effectively equivalent to applying N pulses of amplitude V where each pulse has a width equal to T/N. It may be assumed that a write "1" pulse consists of a pulse of V volts amplitude ($V>|V_{REF}|$) and unit duration ($t_1$) applied between the gate electrode and the drain, source, and substrate of the device in a direction to inhibit conduction and that a write "0" pulse consists of a pulse of amplitude V and of a pulse duration $t_1$ applied between the gate and the source, drain, and substrate of the device in a direction to enhance conduction.

In FIG. 2 the abscissa (X-axis) indicates the applied gate potential, each box representing 1 volt, and the ordinate (Y-axis) indicates the source-drain current level, each box representing 0.01 milliamperes. The voltage at which the curves first start to bend away from the horizontal is the threshold voltage ($V_T$). However, for ease of illustration, $V_T$ is measured at a current level of 0.01 milliamperes. An examination of FIG. 2 shows that the first write "0" pulse (curve A) sets the device to a $V_{TH}$ of approximately −11 volts. The first write "1" pulse (curve B) sets the device to a $V_{TL}$ of approximately −4.4 volts. The second write "1" pulse (curve C) causes the $V_{TL}$ level to shift to approximately −3.8 volts. The third write "1" pulse (curve D) causes a further shift to approximately −3.4 volts, and the fourth write "1" pulse (curve E) causes a further shift to approximately −3.2 volts. A write "0" pulse returns the device to a $V_{TH}$ level of −11 volts which is substantially equal to its original value.

However, if a sufficient number of write "1" pulses are applied, the shift becomes so pronounced that a single write "0" pulse is not sufficient to return the $V_{TH}$ level to its initial value. Secondly, as already mentioned, the threshold level voltage for a P-type device becomes less and less negative, until the device conducts with zero volts on the gate (i.e., it becomes one of the enhancement type—$V_{TL} \geq 0$ volts).

The problem of a shift in the threshold level is solved according to the present invention by periodically cycling the device, as for example, by the insertion of an additional cycling operation before each write operation as in the embodiment of FIG. 3.

The system of FIG. 3 includes a memory array 40 whose word lines ($W_1$, $W_2$) are selectively connected either to a circuit point which is fixed to ground potential or to the output line 53 of cycle generator 52. The choice is made by bidirectional switches consisting of the transmission gate transistor $Q_{11}$, $Q_{12}$, $Q_{21}$, $Q_{22}$ in box 54 under the control of the pulses supplied to word select lines $L_1$, $L_2$ by decoder 56. The latter produces different patterns of pulses on its output leads in response to signals applied to its input lines 57 by a control means (not shown) such as a computer. Such decoders are well known in the art.

The array 40 may have M words of N bits each, where M and N are integers greater than one, and M and N may, or may not, be equal. For ease of illustration in the circuit of FIG. 3, M = N = 2. Each bit location includes a single MNOS transistor of P-conductivity type denoted by $T_{MN}$, where M defines the word position and N defines the bit position. The transistors making up a column (word) have their gate electrodes connected in common to a word line. The transistors making up a row (all having the same bit significance) have their source electrodes connected to a first bit line denoted $B_{N1}$ and their drain electrodes connected to a second bit line denoted $B_{N2}$ where N as before refers to the bit position.

Each bit line is connected to a single pole double throw switch ($S_{N1}$, $S_{N2}$) which clamps the bit line either to ground potential or −V volts during the write operation. During the write operation, as further described below, $S_{N1}$ and $S_{N2}$ are operated in tandem both being returned to the same value of potential. This ensures that there is substantially no potential difference between the two bit lines of a row and thus substantially no current flow therebetween. The switches though operated in tandem during the write operation, are independently controlled and the potential on the bit lines is independent of the impe-dance or ratio of impedances of the switches.

A source 50 of bipolar clock signals is connected to cycle generator 52 which converts the clock signals into a train of pulses which alternately go positive and negative as shown. The pulses go from +V to 0, to −V to 0, and so on. The amplitudes (+V and −V) and pulse widths (T) of the positive and negative going pulses are approximately equal. The cycle generator may include any one of a well known group of circuits for transforming clock pulses into pulses which first go in one direction and then in the other. Where greater precision and/or accuracy of pulse width (T) is desired, the cycle generator 52 could comprise, as is well known in the art, elaborate digital circuitry to perform the cycle generation. Alternately the waveshape shown on line 53 may be generated by computer circuitry to be applied to the word lines of the memory 40.

The N-type MOS (indicated by arrows pointing away from the semiconductor body) transistors ($Q_{11}$, $Q_{21}$) in word select box 54, operated as single pole single throw switches, have one end of their conduction paths connected to pulse line 53 and the other end of their conduction path connected to a different one of the word lines ($W_1$, $W_2$). The P-type MOS (indicated by arrows pointing towards the semiconductor body) transistors ($Q_{12}$, $Q_{22}$) in word select box 54, also operated as single pole single throw switches, have one end of their conduction paths grounded and the other end of their conduction paths connected to a different one of the word lines ($W_1$, $W_2$).

The two transistors associated with each word line are complementary and have their gates connected in common. The gates of transistors $Q_{11}$, $Q_{12}$ are connected to line $L_1$, and the gates of transistors $Q_{21}$, $Q_{22}$ are connected to line $L_2$. Only one of the two complementary transistors will be on at any one time. Therefore, each word line is either clamped to ground potential or to pulse line 53. A positive pulse from decoder 56 applied to one of the word select lines ($L_1$, $L_2$) clamps the corresponding word line ($W_1$, $W_2$) to pulse line 53, and a negative level or pulse from decoder 56 applied to one of the word select lines ($L_1$, $L_2$) clamps the corresponding word line ($W_1$, $W_2$) to ground.

The effect of cycling on the elements of the array is best understood with reference to the waveforms shown in FIG. 4 which illustrates two consecutive write operations. Assume that decoder 56 applies a positive pulse of +V volts on line $L_1$ as shown in waveform A, and a negative pulse of −V volts on line $L_2$. The −V volts on line $L_2$ turns off N-type transistors $Q_{21}$ but turns on P-type transistor $Q_{22}$ clamping word line $W_2$ to ground potential. With $W_2$ grounded, the elements associated with the second column remain undisturbed during the remainder of the write operation.

The +V volts on line $L_1$ turns off transistor $Q_{12}$ but turns on transistor $Q_{11}$ clamping word line $W_1$ to pulse line 53 on which, as shown in waveform B, the bipolar pulses are present.

During the cycle portion (from $t_1$ to $t_4$) of the first write operation, the bit lines ($B_{11}$, $B_{12}$; $B_{21}$, $B_{22}$) are maintained at zero volts. During the time interval from $t_1$ to $t_2$, transistors $T_{11}$ and $T_{12}$ have +V volts applied to their gates and ground potential applied to their drains, sources, and substrate driving them to the $V_{TL}$ state (the devices are assumed to be of the P-type conductivity).

From time $t_3$ to $t_4$, a pulse of −V volts amplitude is applied to the gates of transistors $T_{11}$ and $T_{12}$, and ground potential is maintained on their sources, drains, and substrate driving them to the $V_{TH}$ state. The transistors of word line $W_1$ have thus been cycled to one and then the other of the two selected stable states.

Following the cycle portion of the write operation, information is ready to be written into the elements of the word. Assume that a logic "0" defined as the $V_{TH}$ state is to be written into element $T_{12}$ and that a logic "1" defined as the $V_{TL}$ state is to be written into element $T_{11}$. First, from time $t_5$ to $t_6$ the potential on word line $W_1$ goes to +V volts while the bit lines ($B_{11}$, $B_{12}$, $B_{21}$, $B_{22}$) are maintained at ground potential. This sets the elements ($T_{11}$, $T_{12}$) of the word line $W_1$ to the $V_{TL}$ state. Secondly, from time $t_7$ to $t_8$ the potential on word line $W_1$ goes to −V volts. Concurrently, the potential on bit lines $B_{11}$, $B_{12}$ is clamped to −V volts and the potential on bit lines $B_{21}$, $B_{22}$ is maintained at ground potential. Those elements associated with $W_1$ having their bit lines clamped to −V volts (i.e., $T_{11}$) remain in the $V_{TL}$ state (logic "1") since the gate as well as the source and the drain of these elements are at −V volts. However, those elements of word 1 (i.e., $T_{12}$) whose gate have −V volts applied thereto and whose bit lines (i.e., $B_{21}$, $B_{22}$) are maintained at zero volts are set to the $V_{TH}$ state (logic "0").

Following the first write operation, the information contained in the array may be read out. During the read cycle (not shown) no pulses greater in magnitude than $V_{REF}$ are applied to the transistors. Therefore, they remain undisturbed in the states to which they were set in the preceding write operation.

The next time new information is to be written and stored into the elements of column 1 (illustrated by the second write operation in FIG. 4) a cycle operation (from time $t_9$ to $t_{12}$) identical to that shown for times $t_1$ to $t_4$ is applied to the array. The positive going pulse applied to $W_1$, from time $t_9$ to $t_{10}$ of the cycle operation, sets transistors $T_{11}$ and $T_{12}$ to the $V_{TL}$ state and the succeeding negative going pulse, applied to $W_1$ from time $t_{11}$ to $t_{12}$, sets transistors $T_{11}$ and $T_{12}$ to the $V_{TH}$ state as described above.

Transistor $T_{12}$ which had been pulsed negatively at time $t_7$ to $t_8$ is pulsed positively at time $t_9$ to $t_{10}$ and then is again pulsed negatively at time $t_{11}$ to $t_{12}$. Transistor $T_{12}$ is thus alternately pulsed by pulses of opposite polarities and suffers no undesired shifts in its threshold level.

Transistor $T_{11}$ which had been pulsed positively at time $t_5$ to $t_6$, was then placed in the $V_{TL}$ state. At time $t_7$ to $t_8$ this transistor was not disturbed (source, drain, and gate were all at −V), that is, it remained in the $V_{TL}$ state. At time $t_9$ to $t_{10}$, transistor $T_{11}$ is again positively pulsed and is in the $V_{TL}$ state. Transistor $T_{11}$ is then pulsed negatively at time $t_{11}$ to $t_{12}$. Transistor $T_{11}$ thus receives two pulses of the same polarity (the one at $t_5$–$t_6$ and then the one at $t_9$–$t_{10}$) before it received one of the opposite polarity which has an effect on its threshold state. However, since not more than two effective pulses of the same polarity can be applied consecutively to any one device, the threshold level of the transistor readily is returned to its initial value by the following pulse of opposite value.

Following the cycle operation, new information may be written into and stored in the elements of the array. It has thus been shown that by cycling the elements of the array to one and then to the other of the two selected threshold states, prior to writing new information, that not more than two consecutive pulses of the same polarity are applied to any device thus minimizing any possible shift in the threshold level due to repeated unipolar pulsing.

What is claimed is:

1. The combination comprising:

a field-effect semiconductor device having a source and a drain electrode defining the ends of a conduction channel and a control electrode; said transistor being of the type which in response to a first voltage of greater than a given reference value applied for a given period between the control electrode and the substrate in a direction to inhibit conduction exhibits a first threshold level and which in response to a second voltage of greater than a given reference value applied for said given period between its control electrode and its substrate in a direction to enhance conduction exhibits a second threshold level;

means for setting said device to one of said first and second threshold levels including means for applying one of said first and second voltages for said given period between the control electrode of said device and the source, drain, and substrate of said device; and cycling means for consecutively setting said device to one of said first and second threshold levels and then to the other one of said first and second threshold levels before setting said device to a new one of said first and second threshold levels.

2. The combination as claimed in claim 1 wherein said means for applying said first and second voltages includes means for applying said first and second voltages for the same time duration and wherein said first and second voltages are of equal amplitude but of opposite polarity.

3. The combination as claimed in claim 2 wherein said means for setting said devices includes means for applying a source of reference potential to the source, drain and substrate of said device, and wherein one of said first and second voltages is positive with respect to said reference potential, and wherein the other one of said first and second voltages is negative with respect to said reference potential.

4. A method of operating a memory array of variable threshold field-effect transistors formed on a common substrate, each transistor having a control electrode and first and second electrodes defining the ends of a conduction path, each transistor being of the type which in response to a first voltage of greater than a given reference value applied between the control electrode and the substrate in a direction to cause conduction exhibits a first threshold level and which in response to a second voltage of greater than a given reference value applied between its control electrode and its substrate in a direction to inhibit conduction exhibits a second threshold level; said transistors arranged in rows and columns with the transistors of a row having their conduction paths connected between two bit lines and the transistors of a column having their control electrodes connected in common to a word line, comprising the steps of:

setting said transistors to one of said first and second threshold levels, one column at a time, by applying a reference potential to the drain, source, and substrate and one of said first and second voltages to the word line and then setting selected ones of the transistors of a column to the other one of said first and second threshold levels by applying said reference potential to the drain, source, and substrate and the other one of said first and second voltages to the word line; and cycling said transistors by setting them to one and consecutively to the other one of said first and second threshold levels before each new setting operation.

5. In combination with a memory array of insulated-gate field-effect transistors formed on a common substrate arranged in rows and columns, and having two bit lines per row and one word line per column, each transistor having a control electrode and first and second electrodes defining the ends of a conduction path; the conduction path of the transistors of each row being coupled between the two bit lines associated with that row and the transistors of a column having their control electrodes connected to the word line associated with that column, each transistor being of the type which in response to a first voltage of greater than a given reference value applied for a given time period between its control electrode and its substrate in a direction to cause conduction exhibits a first threshold level and which in response to a second voltage of greater than a given reference value applied for said given time period between its control electrode and its substrate in a direction to inhibit conduction exhibits a second threshold level, the actual value of the threshold level being a function of the amplitude and length of time the voltages are applied; the improvement comprising:

means for applying one and then the other of said first and second voltages to a word line for said given time period for cycling the transistors associated with said word line prior to setting a selected one of the transistors of said word line to one or the other of said first and second threshold levels.

6. The combination as claimed in claim 5 wherein each of said insulated-gate transistors is of the type whose insulator is comprised of two layers, one being a silicon dioxide layer and the other a silicon nitride layer.

7. The combination as claimed in claim 5, wherein said means for applying said voltages further includes means for applying a reference potential to the drain, source, and substrate, wherein said first and second voltages are applied to the word lines and wherein one of said first and second voltages is more positive than, and the other one is more negative than said reference potential.

8. In combination:

an MNOS transistor which is capable of assuming a high threshold state $V_{TH}$ and a low threshold state $V_{TL}$;

means, during discrete write intervals, for placing the transistor in either state; and means for unconditionally cycling the transistor into one and then into the other of its $V_{TH}$ and $V_{TL}$ states prior to each write interval.

* * * * *